C. A. FORD.
COOKING POT COVER.
APPLICATION FILED DEC. 16, 1912.
1,080,905.
Patented Dec. 9, 1913.
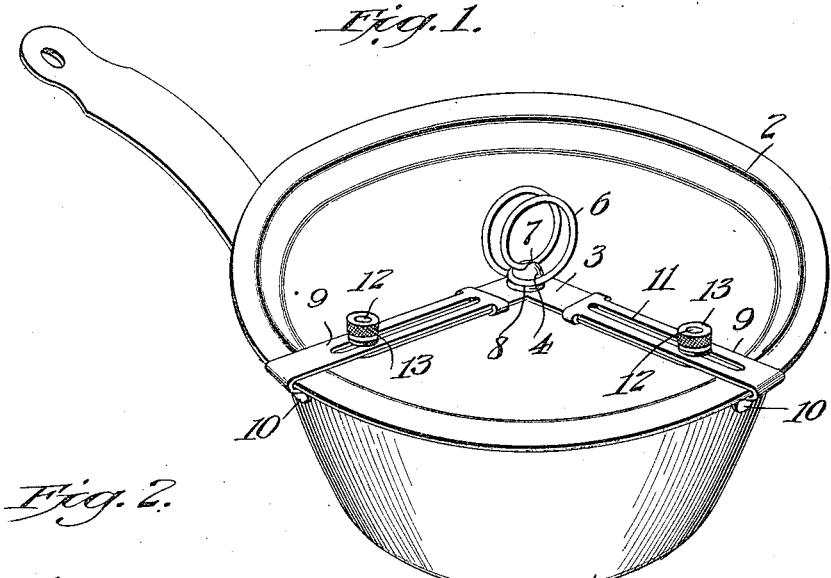
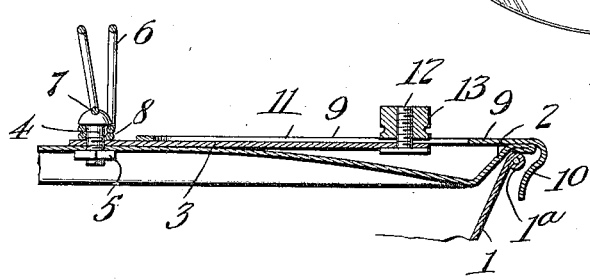
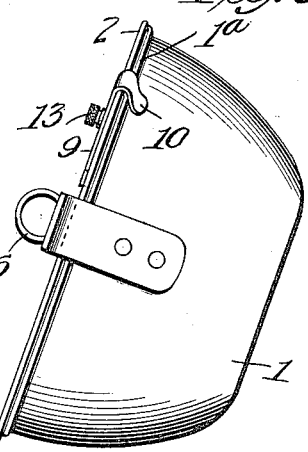
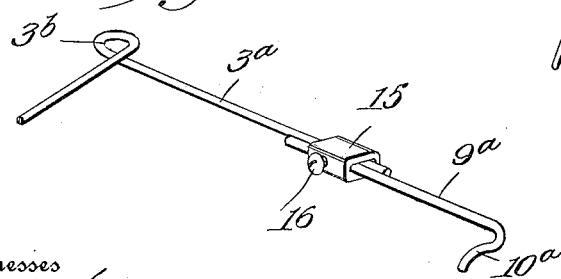
Witnesses
Inventor
C. A. Ford
By
Attorney
COLUMBIA PLANOGRAPH CO., WASHINGTON, D. C.

UNITED STATES PATENT OFFICE.

CHARLES A. FORD, OF NEWARK, NEW JERSEY.

COOKING-POT COVER.

1,080,905.　　　　　　Specification of Letters Patent.　　Patented Dec. 9, 1913.

Application filed December 16, 1912.　Serial No. 737,152.

*To all whom it may concern:*

Be it known that I, CHARLES A. FORD, citizen of the United States, residing at Newark, in the county of Essex and State of New Jersey, have invented certain new and useful Improvements in Cooking-Pot Covers, of which the following is a specification.

The present invention relates to a novel attachment for the covers of cooking pots, saucepans, and like containers, whereby the cover can be readily removed at any time, although it is held securely in position when the container or pot is tilted for the purpose of draining the same.

It is customary at the present time when pouring off hot or boiling liquids from vegetables or other food which has been cooked in a pot or saucepan, to hold the cover in position with a towel and to tilt the pot or saucepan so as to permit the boiling water to drain from the same. This very frequently results in burning or scalding the fingers, and the object of the invention has been to overcome this objection by the provision of an attachment which is adapted to be applied to the cover and which will serve to hold the cover in position when the receptacle is tilted for draining water from the same.

A further object of the invention is to provide a cover attachment of this character which is comparatively simple and inexpensive in its construction, which will operate in an effective manner to hold the cover in position when the pot or saucepan is tilted to drain the same, and which can be adjusted to fit any size of cover.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a cooking pot and cover, the cover being provided with an attachment constructed in accordance with the present invention. Fig. 2 is a sectional view through one of the arms of the cover retaining clamp, portions of the cover and kettle being shown in section. Fig. 3 is a view showing the position assumed by the parts when the kettle is tilted for the purpose of draining the same. Fig. 4 is a detail perspective view showing a modified construction of the invention, portions being broken away, and Fig. 5 is a detail view showing a still further modification.

Corresponding and like parts are referred to in the following description and indicated in all the views of the drawing by the same reference characters.

Referring to the drawings, the numeral 1 designates a conventional cooking pot or container, and 2 the usual cover for the same. An angular stock 3 is applied to the cover, the said stock being formed with a pair of arms which are disposed at an obtuse angle to each other.

At the junction of the two angularly disposed arms an opening is provided for the reception of a fastening member such as the bolt 4. This bolt is adapted to pass through the usual opening provided at the center of the cover 2 for the purpose of securing the stock 3 to the cover, the inner end of the bolt being capped by a nut 5. A finger piece 6 is applied to the head of the bolt 4, the said finger piece being formed by coiling a suitable piece of wire to provide two spaced and substantially complete convolutions, the middle portion of the coiled wire being seated within the kerf 7 of the head of the bolt 4, while the extremities of the wire are curved around the base of the bolt at 8. The coiled wire finger piece is thus interlocked with the head of the bolt so that it can be employed as a handle for turning the bolt when applying the attachment to a cover or removing it therefrom, it being merely necessary to hold the nut 5 and to screw the bolt 4 into or out of engagement with the same. This form of handle or finger piece 6 has a yielding action which admits of a firm grip being readily obtained upon the same, and is also self cooling owing to the large portion thereof which is exposed to the air. It also has the further advantage of enabling a fork or similar implement to be employed for removing the cover should the finger piece or handle ever become so hot as to render it uncomfortable to handle the same.

Each of the angularly disposed arms of the stock 3 has a slide 9 mounted thereon, the said slide being provided at the end thereof with a hooked finger 10 which is adapted to engage the bead 1ᵃ at the upper edge of the cooking pot 1. The slides 9 are adjustably mounted upon the angular arms 3 so as to be moved freely in and out upon the same to admit of the attachment being readily adjusted to fit any size of cover. As shown upon the drawing, the slides 9 are provided with the slots 11 through which clamping screws 12 project, the said clamping screws being capped by the clamping nuts 13. When these clamping nuts 13 are loosened, the slides 9 can be freely adjusted upon the angularly disposed arms of the stock to fit the cover, while when the clamping nuts are tightened, the slides are held securely in position.

When the attachment has been applied to the cover, it will result in providing a pair of hooked fingers at one side thereof. As indicated by Fig. 3, these hooked fingers 10 are designed to be disposed at the top of the cover when the cooking pot or container 1 is tilted to drain the same, and to engage the beaded edge 1ª of the cooking pot to retain the cover in position. This admits of boiling water or liquid being readily poured from vegetables or other articles which may have been cooked in the pot or kettle without the necessity of touching the cover with the hands or manually holding it in position.

A modification is shown in Fig. 4, in which the stock and hooked fingers are formed of wire. The stock 3ª is formed from a single length of wire which is looped upon itself at an intermediate point, as indicated at 3ᵇ, to provide an opening for the reception of the fastening bolt 4, the two arms of the stock diverging from each other at an angle as in the previous instance. The slides 9ª are adjustably mounted upon the outer ends of the arms of the stock, the said slides being provided with hooked fingers 10ª which act as in the previous instance to engage the beaded edge of the cooking pot to hold the cover in position when the pot is tilted. For the purpose of adjustably connecting the slides 9ª to the arms of the stock 3ª, sleeves 15 are provided which loosely receive both the arms and the slides. Clamping screws 16 are threaded in the sleeves 15 and after the slides have been properly adjusted upon the arms of the stock these clamping screws are tightly screwed to retain the members securely in position.

A still further modification is shown in Fig. 5, in which the hooked fingers 10ᵇ are riveted or otherwise rigidly connected to the edges of the cover 2, as indicated at 17. A pair of these hooked fingers 10ᵇ would be disposed at one side of the cover, so as to act as in the previous instance to hold the cover in position when the kettle or pot is tilted to drain the same. Attention is directed to the fact, however, that when the pot or kettle is in an upright position, the attachment does not interfere with removing the cover and placing it in position in the usual manner.

Having thus described the invention, what I claim as new and desire to secure by Letters Patent, is:—

1. An attachment for the covers of pots and kettles including an integral stock comprising a pair of arms disposed at an angle to each other, means at the junction of the arms for securing the stock to the central portion of the top of the cover so that the arms will radiate from the center of the cover upon one side thereof, and hooked fingers carried by the extremities of the arms, the said hooked fingers extending around the edge of the cover and being adapted to engage the beaded upper edge of the pot upon the side thereof remote from the turning spout of the pot so as to retain the cover in position when the pot is tilted to drain the contents thereof.

2. An attachment for the covers of pots and kettles including an integral stock comprising a pair of arms disposed at an angle to each other, means at the junction of the arms for securing the stock to the top of the cover at the center thereof so that the arms will radiate from the center of the cover toward one side thereof, a slide adjustably mounted upon each of the arms, and a hooked finger at the extremity of each of the slides, the said hooked fingers being adapted to extend around the edge of the cover and to engage the beaded upper edge of the kettle upon the side thereof remote from the turning spout so as to retain the cover in position when the kettle is tilted to drain the contents thereof.

3. An attachment for the covers of pots and kettles, including a stock comprising a pair of arms disposed at an angle to each other, means at the junction of the arms for securing the stock to the top of the cover at the center thereof so that the arms will radiate from the center of the cover toward one side thereof, a slotted slide slidably mounted upon each of the arms, clamping screws projecting from the arms and received within the slots of the slides, nuts applied to the clamping screws, and a hooked finger at the extremity of each of the slides, the said hooked fingers extending around the edge of the cover and being adapted to engage the bead at the upper edge of the kettle upon the side thereof remote from the turning spout so as to retain the cover in position when the kettle is tilted to drain the contents thereof.

4. An attachment for the covers of pots and kettles, including an integral stock comprising a pair of arms disposed at an angle to each other and constructed at their junction for engagement with the handle of the cover so that the arms will radiate from the center of the cover upon one side thereof, and hooked fingers carried by the extremities of the arms, the said hooked fingers extending around the edge of the cover and being adapted to engage the beaded upper edge of the pot upon the side thereof remote from the turning spout of the pot so as to retain the cover in position when the kettle is tilted to drain the contents thereof.

In testimony whereof I affix my signature in presence of two witnesses.

CHARLES A. FORD.

Witnesses:
CHARLES B. TRIPP,
EDWARD O. PALKER.